(12) United States Patent
Cassoni

(10) Patent No.: US 6,715,774 B2
(45) Date of Patent: Apr. 6, 2004

(54) MOTORIZED GOLF CAR WITH DETACHABLE GOLF CLUB CARRIER

(76) Inventor: Robert P. Cassoni, 2366 Wymore Pl., Centerville, OH (US) 45459

( * ) Notice: Subject to any disclaimer, the term of this patent is extended or adjusted under 35 U.S.C. 154(b) by 0 days.

(21) Appl. No.: 09/924,039

(22) Filed: Aug. 7, 2001

(65) Prior Publication Data

US 2003/0029646 A1 Feb. 13, 2003

(51) Int. Cl.[7] ................................................. B62B 1/00
(52) U.S. Cl. .................. 280/47.131; 414/462; 224/274; 280/DIG. 5; 280/DIG. 6
(58) Field of Search ................................. 224/274, 282; 414/462; 280/DIG. 5, DIG. 6, 47.131, 47.17, 47.24; 180/19.1

(56) References Cited

U.S. PATENT DOCUMENTS

| | | | | |
|---|---|---|---|---|
| 2,825,574 A | * | 3/1958 | Williamson | 280/13 |
| 3,043,389 A | * | 7/1962 | Steinberg | 180/208 |
| 3,059,713 A | * | 10/1962 | Beggs | 180/11 |
| 3,583,510 A | * | 6/1971 | Hastings | 180/11 |
| 3,608,659 A | * | 9/1971 | Gardner | 180/19.3 |
| 3,777,836 A | * | 12/1973 | Riza | 180/213 |
| 3,784,138 A | * | 1/1974 | Herling et al. | 224/274 |
| 4,042,055 A | | 8/1977 | Ward | 180/60 |
| 4,061,257 A | * | 12/1977 | St. Clair | 211/70.2 |
| 4,533,013 A | | 8/1985 | Hightower | 180/210 |
| 4,538,695 A | * | 9/1985 | Bradt | 180/19.2 |
| 4,573,549 A | * | 3/1986 | Pankow | 180/216 |
| 5,215,194 A | * | 6/1993 | Blanford et al. | 206/315.3 |
| 5,472,084 A | | 12/1995 | Aliano, Jr. | 206/315.3 |
| 5,482,304 A | | 1/1996 | Smith | 280/204 |
| D369,762 S | * | 5/1996 | Molzon et al. | D12/16 |
| 5,671,842 A | * | 9/1997 | Jaworski | 206/315.3 |
| 5,727,642 A | | 3/1998 | Abbott | 180/65.1 |
| 5,738,261 A | * | 4/1998 | Dula | 224/282 |
| 5,806,738 A | * | 9/1998 | D'Angelo | 224/274 |
| 5,890,545 A | | 4/1999 | Smith et al. | 172/200 |
| D409,557 S | * | 5/1999 | Armour | D12/408 |
| 6,007,031 A | * | 12/1999 | Tang | 248/96 |
| D432,460 S | * | 10/2000 | Huang | D12/16 |
| 6,164,896 A | * | 12/2000 | Cummins | 224/521 |
| 6,193,256 B1 | | 2/2001 | Banary, Jr. | 280/400 |
| 6,238,171 B1 | | 5/2001 | Carter | 414/563 |
| 6,361,264 B1 | * | 3/2002 | Guthrie et al. | 224/521 |
| 6,409,188 B1 | * | 6/2002 | Hesmer | 248/96 |
| 6,471,281 B1 | * | 10/2002 | Tyrer et al. | 296/100.11 |
| 2001/0048011 A1 | * | 12/2001 | Burns | 224/527 |

FOREIGN PATENT DOCUMENTS

| | | | | |
|---|---|---|---|---|
| FR | 2674810 A1 | * | 10/1992 | B62B/3/12 |
| JP | 10155954 | | 6/1998 | |

* cited by examiner

Primary Examiner—Lesley D. Morris
Assistant Examiner—Daniel Yeagley

(57) ABSTRACT

A motorized golf cart with a detachable golf club carrier includes a motorized golf cart for movement over a ground surface. The golf cart has a motor and a first hitching device at an exterior of the golf cart. The detachable golf club carrier has a handle, a carrier body, a golf club bag, at least one wheel and a second hitching device. The golf club carrier and the motorized golf cart can be hitched together without lifting the golf club carrier.

29 Claims, 18 Drawing Sheets

MOTORIZED GOLF CAR WITH DETACHABLE GOLF CLUB CARRIER

BACKGROUND OF THE INVENTION

The present invention relates generally to the sport of golf, and more particularly to golf cars or carts and golf club carriers.

On a golf course, golfers often carry their own golf clubs in a golf club bag. The golfers may walk the entire course with the golf club bag held by a strap swung over their shoulder. A typical set of golf clubs may include 12 golf clubs or more. The set of clubs thus is often heavy and cumbersome to carry over an entire course. A caddie may accompany the golfer to aid in carrying the golf clubs.

Wheeled golf club carriers, also known as pull or push carts, have been developed to permit golfers to wheel their clubs over the course, by pulling the carrier by hand. The golf club carriers typically permit a golf bag to be attached by straps, and the golf bag is thus transported over the entire golf course by the golfer pulling or pushing the carrier. Such manual golf club carriers and the associated walking of the entire course however lead to slow golf games, which can be a major problem on popular golf courses. Moreover, some golfers fatigue or are incapable of walking an entire golf course, which can require 4 kilometers of travel or more.

Motorized golf cars capable of carrying two golfers and having a golf bag bay for carrying the golfers golf bags and typically having electric or internal-combustion motors, also are known. These golf cars are known colloquially as golf carts, and the two terms are used interchangeably herein. Some courses even require such carts to speed golf play. These motorized golf carts typically move along specially-designated areas, or cart paths, on the golf course so that golfers can proceed with ease quickly throughout the golf course. Some golf courses permit golf carts to travel not just on the cart paths, but also over the entire course, including fairways. However, this travel can damage the golf course. For example, when a fairway is wet, the golf carts can leave muddy track marks on the fairway or even on the greens. For this reason, many golf courses confine motorized golf carts to the cart paths.

When using a motorized golf cart, golfers typically place their golf bags in the golf cart and strap them in. They do not remove the bags during play, since the bags with the clubs are heavy and the golf bag must be lifted to be strapped in. Typically, the bottom of the bag sits at least 0.3 meters from the ground, and the straps are even higher. The lifting of the golf bag in the first place is also burdensome.

On a course where the motorized golf carts are confined to the cart paths, golfers without caddies typically golf as follows: (1) The golfer drives his cart to a tee, decides what club to use and removes that club from the golf bag located in the golf cart, and then tees off; and (2) the golfer then drives the cart along the path to a location near the golf ball, guesses which one or two clubs might be proper, removes the clubs from the golf bag situated or attached to the golf cart; and then walks to the golf ball with the clubs in hand, and hits the ball. This second step continues until the golfer has placed the ball in the cup.

A problem occurs when a golfer selects the wrong club or clubs from the bag in the motorized cart. Improper selection can occur for example because of the lie or by mistaking the distance of the ball or the wind speed at the location of the ball. The golfer then must walk back to the cart and replace his clubs with a proper club. Since his ball may be a long distance from the golf cart, a long delay can result. Moreover, his partner in the motorized golf cart, which typically has two seats, could have driven the motorized cart to a new location, leading to even longer delays.

If two players are using a motorized cart on a golf course where motorized carts are permitted on the fairway, a similar problem may occur: the first golfer may choose one or two clubs, and the second golfer will drive the cart to a new position. If the first golfer has chosen the wrong clubs and must return to the golf cart at a new location to exchange clubs, the speed of play can be drastically reduced.

U.S. Pat. No. 5,472,084 discloses a piggyback golf bag for use in a riding golf cart. An attachment device can connect the golf bag to the golf cart. The golf bag when attached to the golf cart rides in a compartment and must be lifted onto the golf cart.

U.S. Pat. Nos. 6,193,256 and 5,482,304 disclose trailer devices for golf equipment. The golf equipment trailer of the '256 patent does not function as a golf club carrier, which is defined herein as a manually-movable golf club carrier, such as push or pull cart. The pull-type golf cart of the '304 patent is attachable solely to a bicycle, and appears not to be intended to be detachable during play but rather that the bicycle be ridden on the golf course.

SUMMARY OF THE INVENTION

An object of the present invention is to permit golfers to easily attach a golf club carrier to a motorized golf cart. Another alternate or additional object is to permit golfers to take all their clubs with them as they travel about a golf course on a motorized golf cart. Yet another alternate or additional object of the invention is to reduce the use of motorized golf carts on fairways and playing surfaces on a golf course. Still a further alternate or additional object of the present invention is to reduce the amount of lifting required by a golfer on a golf course. One other alternate or additional object of the present invention is to speed the play of golf on a golf course.

The present invention provides a golf cart with a detachable golf club carrier comprising a motorized golf cart for movement over a ground surface, the golf cart having a motor and a first hitching device. A manually-operable golf club carrier has at least one wheel and a second hitching device removably connected to the first hitching device, the second hitching device and the first hitching device being connectable while the at least one wheel is on the ground surface.

The golf club carrier thus can be easily attached and detached to the motorized golf cart, without any lifting, as the golf cart is driven and then stopped at various points along a cart path or anywhere on the course. The golfer can unhitch the golf club carrier and wheel it, along with all the golfer's golf clubs, to a desired location on the course. Any club can be selected. The first golfer's companion, if any, in the golf cart can drive the cart on to the next desired location, without worrying that the first golfer will need to return due to improper club selection. The first golfer can then wheel the golf club carrier to the next ball location or back to the motorized golf cart, where it can be easily reattached without lifting.

In a highly preferable embodiment, the wheels of the golf club carrier are retractable from the ground surface when the second hitching device is connected to the first hitching device. The golf clubs and the carrier thus are better protected on the cart, as ground disturbances are not transferred via the wheel of the golf club carrier as the golf cart is driven. Moreover, reverse motions of the cart will not cause the golf club carrier to jackknife or be damaged.

However, the wheel of the golf club carrier could remain on the ground in a less preferable embodiment. The golf club carrier then preferably includes at least one shock absorber.

The first hitching device may include a bar and the second hitching device a latch for latching onto the bar. Preferably, the first and second hitching devices attach at a single location. However, the first hitching device may connect to the second hitching device at more than one location.

Preferably, the golf club carrier has two wheels and further includes an axle connecting the two wheels. The motorized golf cart preferably has two seats, and four wheels. The present invention is advantageously used with the two seats, since this permits a companion to continue to travel as the first golfer is using the detached golf club carrier. The advantages of the present invention for two golfers are numerous, as speed of play even on a course that permits carts on fairways can be increased. Preferably, two golf club carriers are attached to each motorized golf cart.

The golf club carrier preferably includes an actuating device for removably connecting the second hitching device to the first hitching device, the actuating device most preferably being at a handle of the golf club carrier. The golf club carrier preferably is a pull cart. The carrier may include a carrier body, with the actuating device including a handle rotatable with respect to the carrier body. In a preferred embodiment, the actuating device preferably allows the golfer to remove and connect the golf club carrier using a single hand.

The golf club carrier preferably includes a golf club bag removable from the carrier body, although the bag may be integrated with the golf club carrier.

The first hitching device may be located at a side of the golf cart, and may be detachably secured to the golf cart. By being placed on the side, the golf club carrier attached to the first hitching device, and the first hitching device itself, are protected from rear end collisions with other carts. However, it is possible for the first hitching device to be located at the rear of the golf cart or anywhere else along the perimeter of the golf cart The golf cart may have a third hitching device, and the preferred second golf club carrier have at least one second wheel and a fourth hitching device removably connected to the third hitching device, which may be at the side or anywhere on the perimeter of the golf cart.

The present invention also provides a golf cart comprising a frame, a motor supported in the frame, at least one seat supported in the frame, and a hitching device connected to the frame, the hitching device operative for attaching a detachable wheeled golf club carrier without lifting of the golf club carrier.

The hitching device preferably is detachable from the golf cart, for example through screws, and may be retrofitted to existing golf carts.

The frame has sides, and the first hitching device is preferably connected to one of the sides. Another hitching device similar to the first hitching device may be connected to the frame, the second hitching device operative for connecting another detachable wheeled golf club carrier.

Most preferably, the hitching device is located less than or equal to 0.25 meters from the ground when the golf cart is in operation, so a proper leverage with the golf club carrier can be achieved.

The present invention also provides a golf club carrier comprising a carrier body, a golf bag supported by the body for holding a plurality of golf clubs, and at least one wheel connected to the carrier body. A handle connects to the carrier body for permitting a person to move the carrier using the at least one wheel. A hitching device connects to the carrier body for connecting to another hitching device on a golf cart.

The at least one wheel preferably is retractable when the hitching device is connected to the other hitching device.

The golf club carrier may have a support surface, with the golf club carrier capable of standing upright when the support surface and the at least one wheel contact ground.

The present invention also provides a method for connecting a wheeled golf club carrier to a motorized golf cart comprising the steps of wheeling the golf club carrier using a handle aside the motorized golf cart using at least one wheel of the golf club carrier and connecting the golf club carrier to the motorized golf cart while the at least one wheel remains on a ground surface.

The connecting step may further include retracting the at least one wheel from the ground surface.

The golf club carrier may be unhitched from the motorized golf cart repeatedly over during a golf game.

The present invention also provides a method for connecting a wheeled golf club carrier to a motorized golf cart comprising the steps of moving the golf club carrier aside the motorized golf cart using a handle and at least one wheel of the golf club carrier and connecting the golf club carrier to the motorized golf cart without lifting the golf club carrier In addition the present invention also provides in a preferable embodiment a motorized golf cart with a detachable golf club carrier comprising a golf cart for movement over a ground surface, the golf cart having a motor and a first hitching device at an exterior of the golf cart, and a golf club carrier having a handle, a carrier body, a golf club bag, at least one wheel and a second hitching device. The golf club bag is selectively attachable to the carrier body, with the second hitching device removably connected to the first hitching device, and with the second hitching device being connected to the carrier body.

With the present device, a novel method for playing golf is possible. The present invention thus also provides a method for playing golf comprising the steps of attaching a first detachable wheeled golf club carrier to a motorized golf cart, attaching a second detachable wheeled golf club carrier to the motorized golf cart, and repeatedly detaching and attaching the first and second detachable wheeled golf club carriers from the golf cart during a game of golf.

Preferably, the detachable wheeled golf club carriers need not be lifted to be attached.

The present invention also provides in a preferable embodiment a motorized golf cart with a detachable golf club carrier comprising a golf cart for movement over a ground surface, the golf cart having a motor and a first hitching device at an exterior of the golf cart, the first hitching device having at least one attachment point less than or equal to 0.25 meters from the ground surface, and a golf club carrier having a handle, a carrier body, a golf club bag, at least one wheel and a second hitching device for connecting to the first hitching device.

The low positioning of the hitching device minimizes the angle required to tip the bag so as to attach the carrier to the golf cart.

The present invention also provides in a preferable embodiment that a motorized golf cart with a detachable golf club carrier comprising a golf cart for movement over a ground surface, the golf cart having a motor and a first hitching device at an exterior of the golf cart, and a golf club carrier having a handle, a carrier body, a golf club bag, at least one wheel and a second hitching device for connecting to the first hitching device. The golf club carrier has a weight associated with it, and the first hitching device carries the entire weight of the golf club carrier in a locked position. The hitching device is thus cantilevered with respect to the golf cart.

This provides an advantage over existing carts, where a flat surface must be provided to support a bottom of the golf bags. Shorter and more compact golf carts can be designed.

Hitching device as defined herein is any type of connecting device operable to prevent the golf club carrier from detaching from the motorized golf cart during normal operation on a golf course, and may include an existing part of conventional golf carts or golf club carriers. It also may include more than one part separated from another, e.g. the interconnection of the first and second hitching devices may occur at more than just a single point.

Advantageously, the hitching device may be retrofitted to an existing cart, the hitching device in this embodiment thus not being a part of an existing cart.

In addition to the advantages of the present invention enjoyed by the golfer, the golf course operator employing the present invention can: (1) maintain a well-groomed course by restricting ride carts to the paved paths or only to 90° fairway angles; (2) improve the pace of play (more golfers per day means more money per day) by enabling golfers to have ride cart speed with golf club carrier access; (3) charge an additional fee for the golf club carrier attachment, since the ride carts can be operated with or without the pull cart attachment; and/or (4) attract golfers to the course by offering improved access and convenience over the course.

The present invention also has the added advantage that a foursome golfing with two carts can switch partners easily and repeatedly throughout a golf game. For example, a first golfer and a second golfer have carriers attached to one golf cart, and a third and fourth golfer have carriers attached to the second cart. The first golfer and second golfers hit balls near the ball of the third golfer. The fourth golfer's ball is further away. The first golfer and second golfers can drive to near their balls, and release their carriers. The fourth golfer can drop off the third golfer, who detaches that golfers' carrier. The fourth golfer can proceed further. Any of the first, second and third golfers, perhaps the one closest, can then later join up with the fourth golfer and the second golf cart and reattach the golf bag carrier. When playing a foursome (or threesome), this arrangement also eliminates worry about the pairing of golfers in the golf carts at the start of the game, since the golfers may switch carts easily. Also speed of two-cart play can be significantly increased, since players can return to the closest cart.

BRIEF DESCRIPTION OF THE DRAWINGS OF THE PREFERRED EMBODIMENT

The present invention will be shown with reference to a preferred embodiment which advantageously provides single hand attachment and release of the golf club carrier, in which.

DETAILED DESCRIPTION OF THE PREFERRED EMBODIMENT

The present invention will be described with reference to a preferred embodiment which permits a single hand removal and attachment of the golf club carrier to a motorized golf cart.

Figure 1:
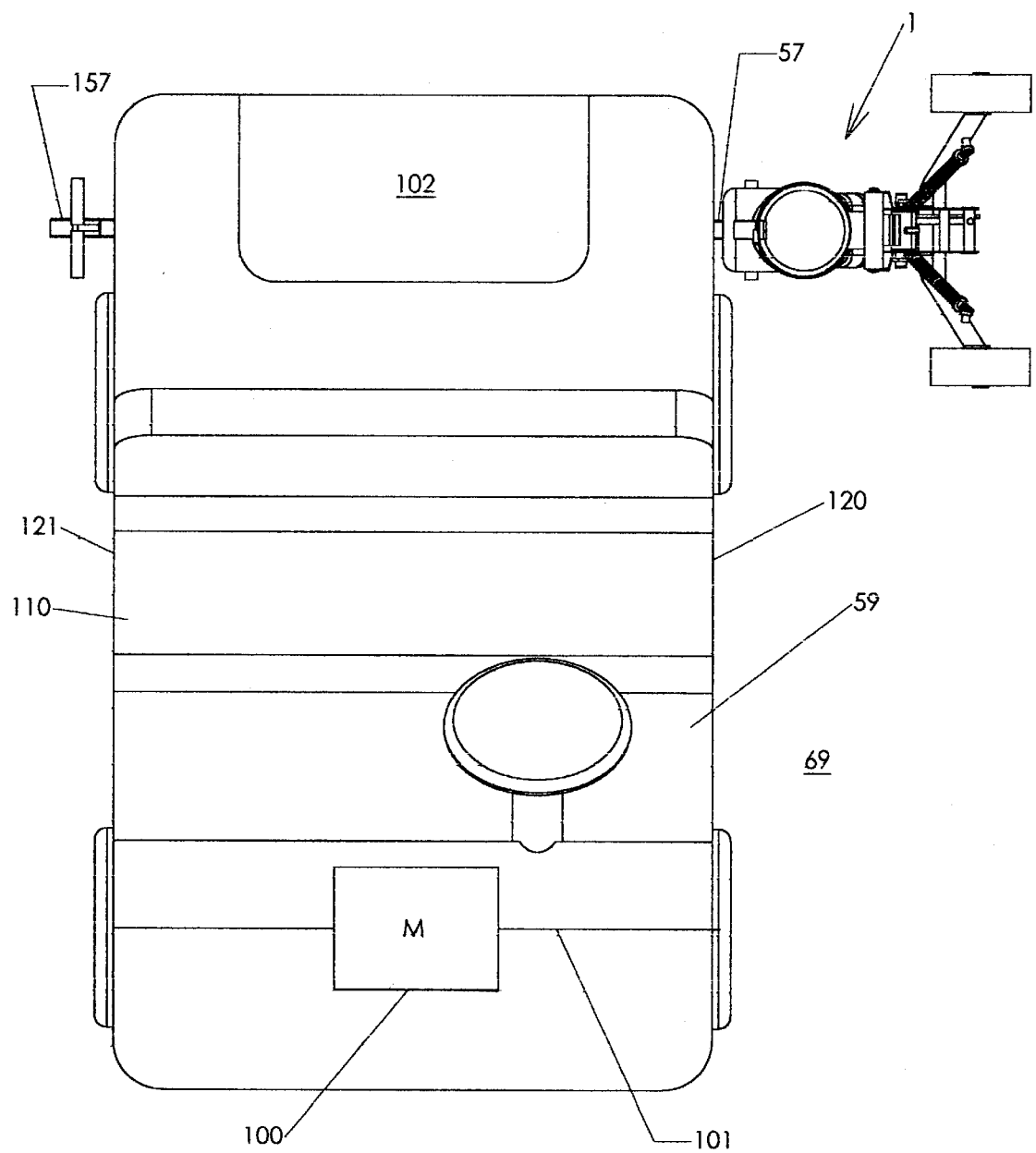
FIG. 1 shows the golf cart with two hitching devices and a detachable wheel golf club carrier attached to one of the hitching devices.

FIG. 1 shows, in schematic form, a motorized golf cart 59 having a motor 100 with an axle 101 driving front wheels 201, 202 or rear wheels 203, 204 of the cart 59. The motor 100 may be any type of motor, for example electric or internal combustion driven. The cart 59 is an existing cart with seats 205, 206 for two golfers and having a golf bag bay 102. The cart 59 has been retrofitted with a first mount bracket 57 and a second mount bracket 157 located at sides 120 and 121, respectively of a frame 110 of the golf cart 59. The first and second mounting brackets 57, 157 comprise hitching devices of the cart 59 in this embodiment, and may be retrofitted to the cart, for example using bolts or linearly sliding clamps fastened to the side, rear or front of the golf cart 59. The cart 59, prior to having brackets 57 and 157 installed, defines a footprint above a ground surface 69.

A wheeled golf club carrier 1 has wheels 31 is detachably connected to the mount 57. The carrier 1 or a similar carrier can be attached releasably to the second mount 157.

Figure 2:
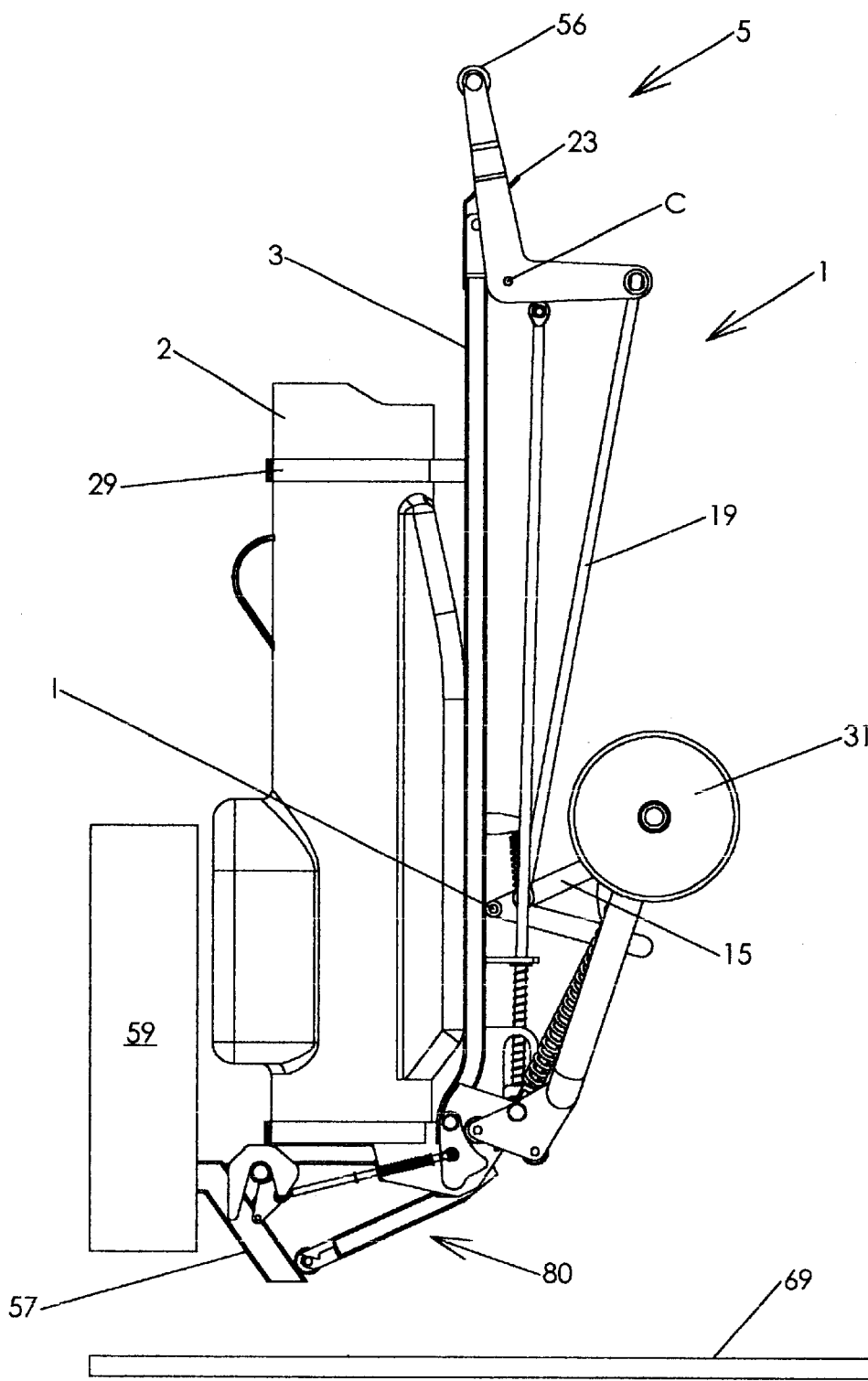
FIG. 2 shows a side view of the golf club carrier cantilevered and locked to the golf cart.

FIG. 2 shows a side view of the golf club carrier 1 mounted to the motorized golf cart 59 in a cantilevered fashion. Golf club carrier 1 has a carrier body 3, a handle assembly 5, a golf bag 2, retractable wheels 31, and a latching device 80, which in this embodiment is a hitching device for the golf club carrier. Golf bag 2 may be fastened to carrier body 3 using straps 29, for example, or may be integral with the carrier body 3. The handle assembly 5 is rotatable with respect to carrier body 3 about an axis C, and may be held with respect to the carrier body 3 through a clip-in fit of the handle assembly 5 with a latch spring 23.

Contact between the latching device 80 and the mount bracket 57 preferably takes place at a lowest location approximately 0.25 meters, or less, above a ground surface 69. This provides enough clearance for the mount bracket 57, and yet provides for easy detachment and attachment of the carrier 1 from cart 59.

In the position shown in FIG. 2, the carrier 1 is locked in place on the cart 59 through the interaction of latching mechanism 80 and mount bracket 57.

Detachment of the carrier 1 begins with a golfer pulling handle assembly 5 away, with the latch spring 23 being able to be elastically deform with a hand movement to release the handle assembly. Handle assembly 5 thus is rotated about axis C. Rotation of handle assembly 5 about axis C causes a leg actuation shaft 19 of the carrier 1 to move downwards, thus causing a leg actuation bracket 15 to rotate clockwise about an axis I until the leg actuation bracket 15 stops against the body 3, as shown in FIG. 3.

Figure 3:
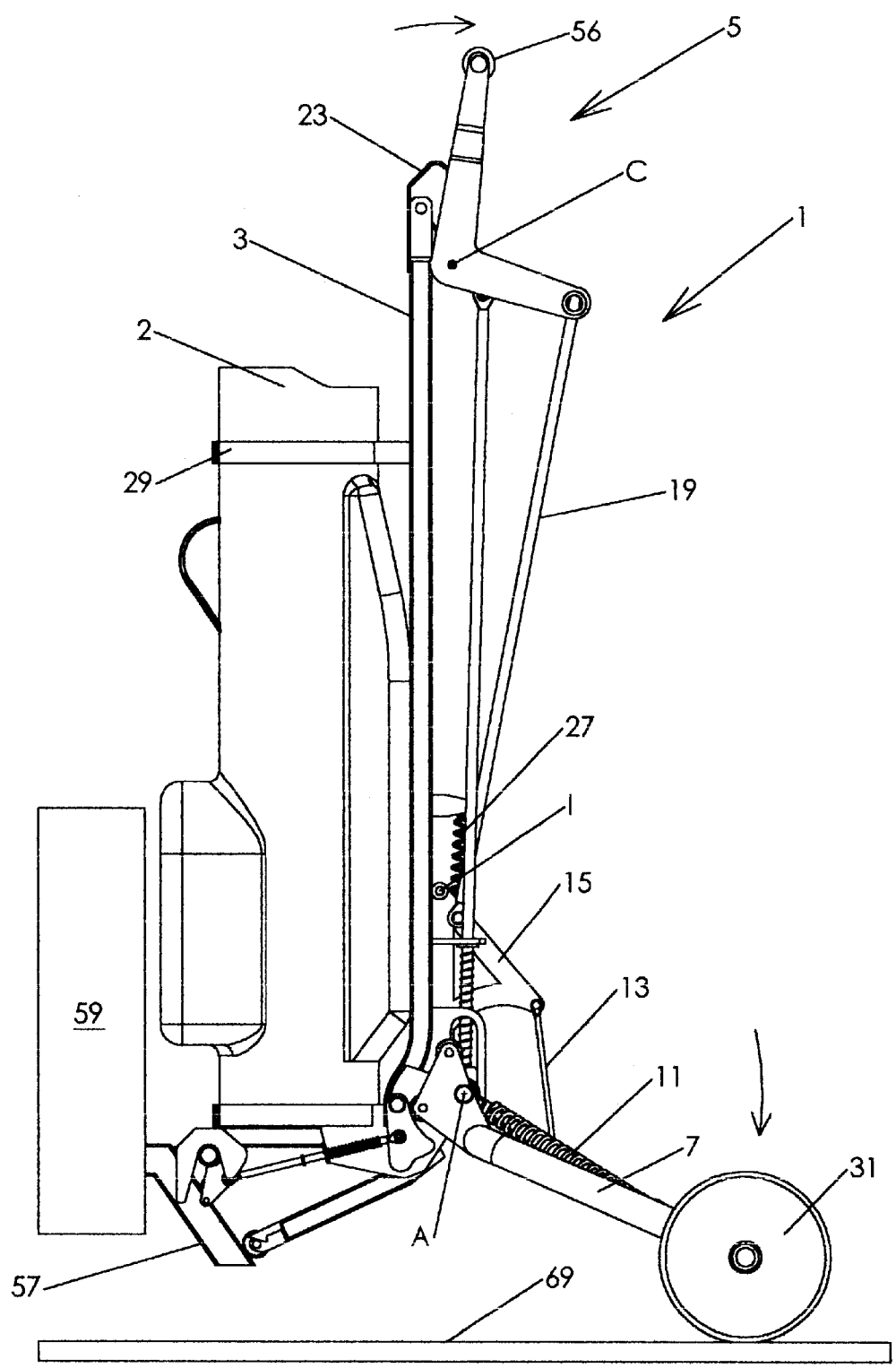
FIG. 3 shows a side view of the golf club carrier with the wheels contacting the ground as the carrier is removed.

As shown further in FIG. 3, as the leg actuation bracket 15 rotates about axis I, a leg actuation cable 13 is lowered allowing a hinged leg assembly 7 supporting wheels 31 to rotate freely about an axis A until the wheels 31 contact the ground surface 69. A leg actuation spring 27 connected between the carrier body 3 and the bracket 15 counteracts the torque about axis A imposed by the weight of the hinged leg assembly 7 and the wheels 31, thus reducing the required input force at the handle assembly 5 necessary to raise the wheels 31 again when attaching the carrier 1.

Main leg springs 11, to be described later, are under compression at this point, and the springs 11 have no influence on the rotation of the hinged leg assembly 7 about axis A, since a spring loading assembly 17 (FIG. 4), also to be described in more detail later, and its axis B (FIG. 4), is coincident with axis A. This configuration reduces the moment arm for the reaction of the forces from the main leg springs 11 to zero producing zero torque for the hinged leg assembly about axis A.

The leg actuation cable 13 preferably is flexible to compensate for irregularities in the ground height between the motorized golf cart 59 and the golf club carrier 1.

Figure 4:
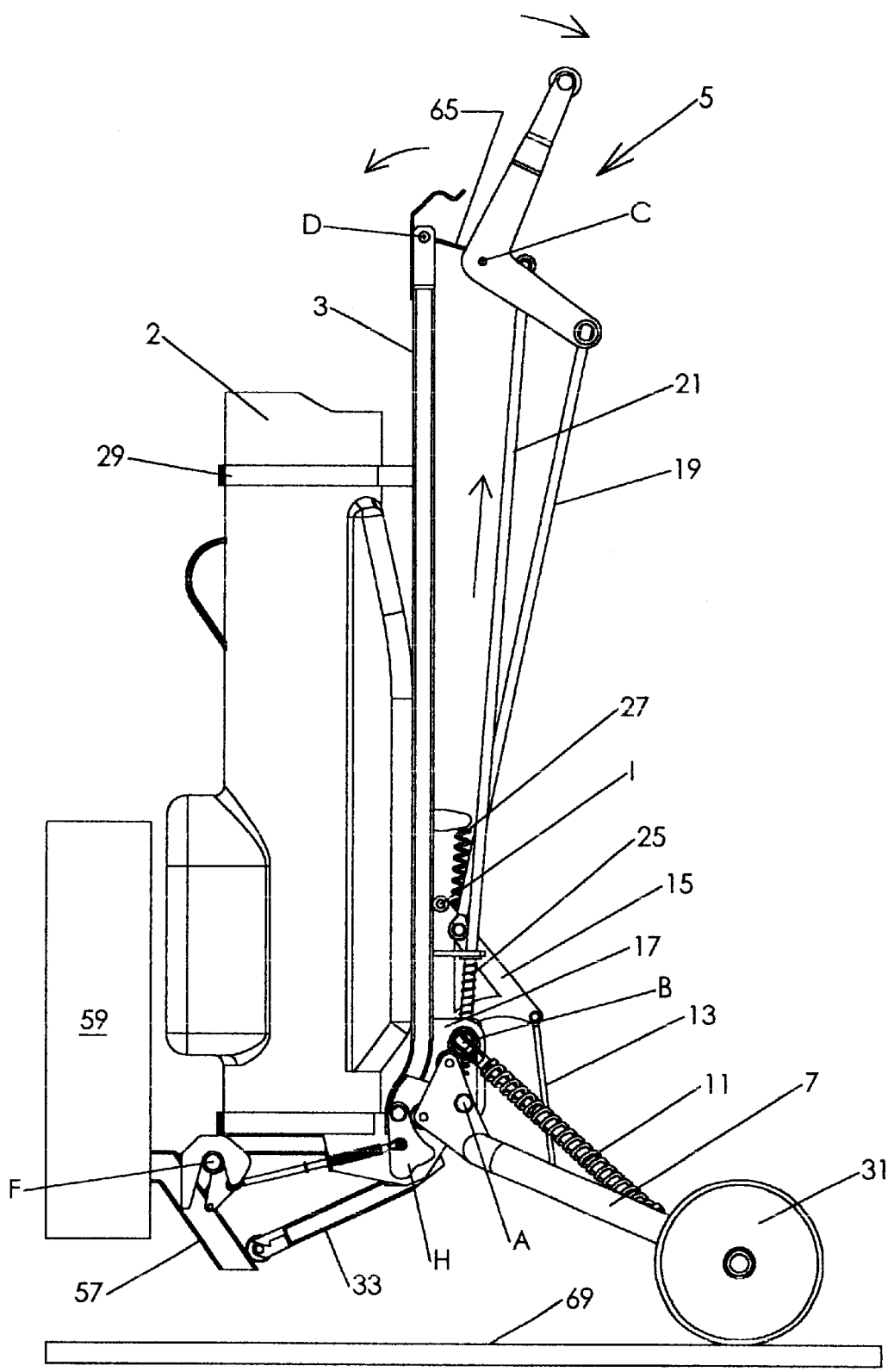
FIG. 4 shows a side view of the golf club carrier as in FIG. 3 with the handle rotated further for removal of the golf club carrier.

FIG. 4 shows a side view of the golf club carrier after a golfer performs the motions described in FIG. 3 and continues to pull on the handle assembly 5, thus producing a clockwise rotation about axis C as well as a counter-clockwise rotation of a handle link arm 65 about axis D. As a result, a spring load shaft 21 is pulled upwards which in turn raises the spring loading assembly 17. Raising the spring loading assembly 17 accomplishes three distinct tasks. First, it separates axis A and an axis B of the spring loading assembly 17 providing a moment arm for the force of the main leg springs 11 to produce a torque on the hinged leg assembly 7 about axis A. This torque produces a force at the wheels 31 which in turn produces a torque about axis F to compensate for the torque created about axis F from the weight of the golf club carrier 1. Second, it raises a cam roller 53 (FIG. 17) above the back edge of the lower mount arm 33 allowing the lower-mount arm 33 to rotate clockwise about an axis H. Third, it locks the leg actuation bracket 15 between the carrier body 3 and the spring loading assembly 17, preventing bracket 15 from rotating counter-clockwise about an axis I. A load balance spring 25 compresses to counteract the upward force of main leg springs 11 when wheels 31 are lowered to the ground surface 69. This spring 25 allows for minimal handle force in raising or lowering the spring loading assembly 17.

Figure 5:
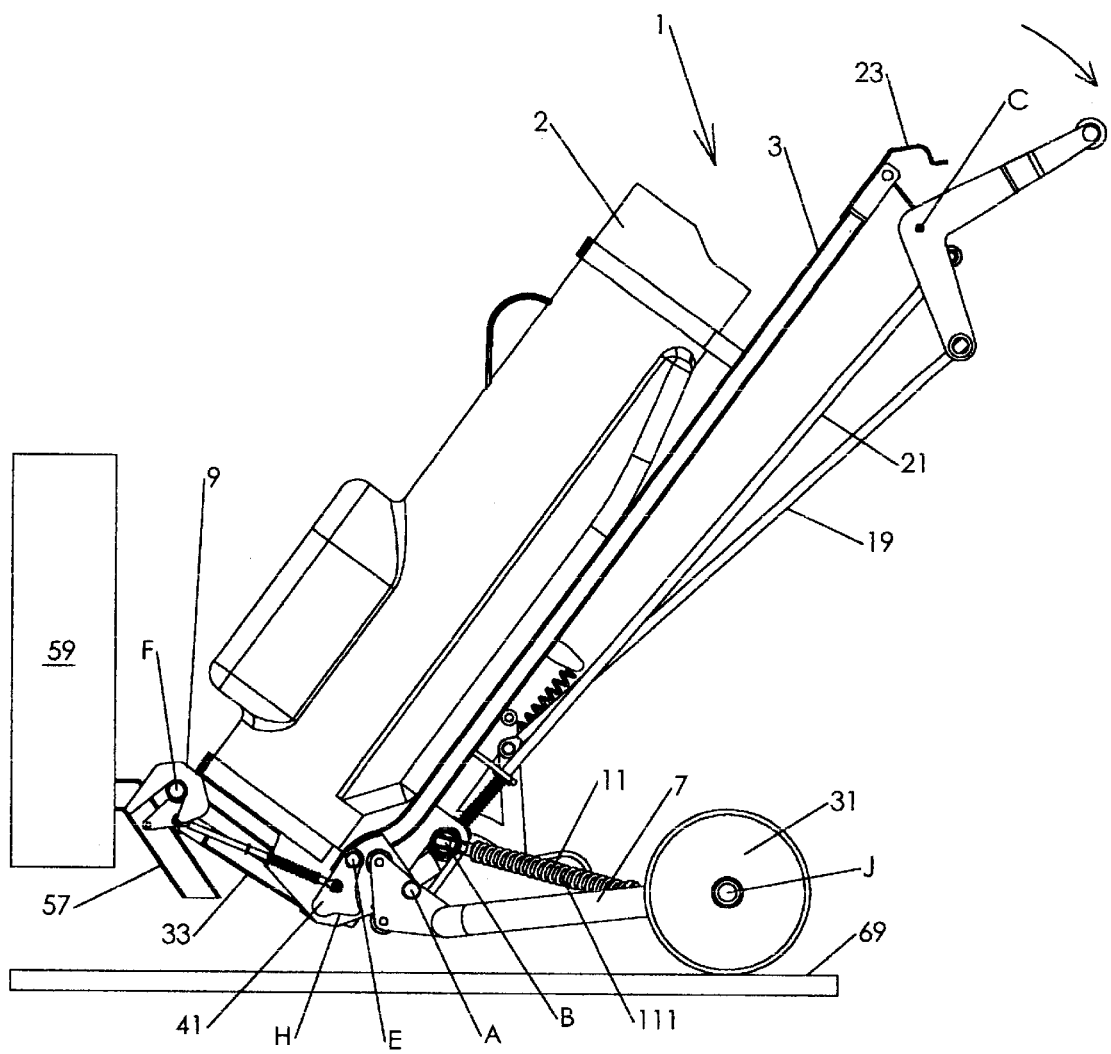
FIG. 5 shows a side view of the golf club carrier as in FIG. 4 with the handle pushed down for further removal of the golf club carrier.

FIG. 5 shows a side view of the golf club carrier 1 after a golfer performs the motions described in FIG. 4 and continues to pull on the handle assembly 5. This action causes the golf club carrier 1 to rotate about axis F, which in turn causes lower mount arm 33 to rotate clockwise about axis H. As the lower mount arm 33 is rotated about axis H, the cam roller 53 (FIG. 17) and spring loading assembly 17 are locked in an upward position (with axis A and axis B separated) between the lower mount arm 33 and an upper portion of slots on the main frame 3, preventing motion of the cam roller 53 and spring loading assembly 17 relative to the main frame 3. As the golf club carrier is rotated about axis F, the hinged leg assembly 7 is rotated about axis A until a telescoping mandril 111 inside main leg spring 11 bottoms out as it compacts, preventing further rotation. The torque created by the main leg springs 11 aids in canceling the torque created by the weight of the golf club carrier 1. The handle movement also causes a mount claw 9 to rotate about axis F, mount claw 9 being fixed with respect to carrier body 3.

Figure 6:
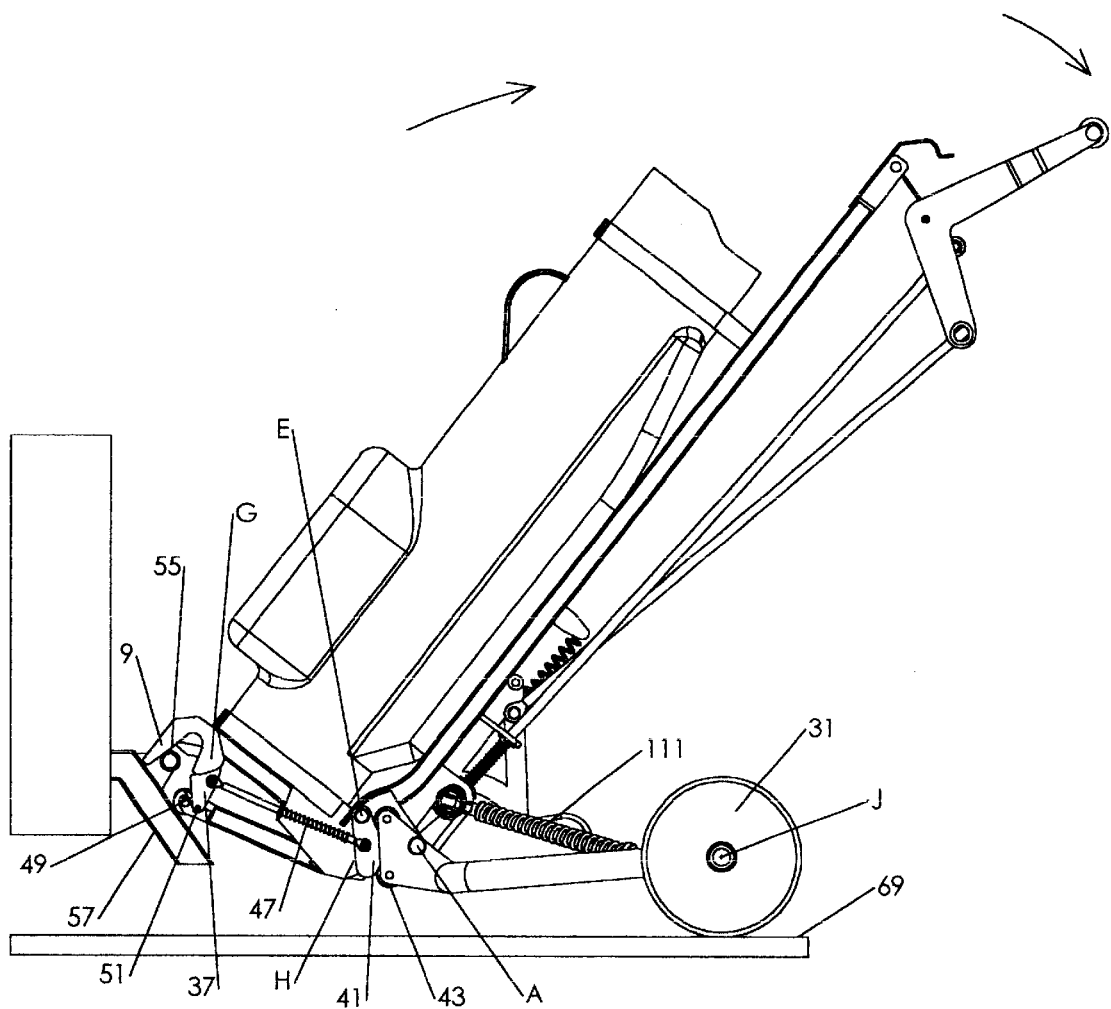
FIG. 6 shows a side view of the golf club carrier as in FIG. 5 with the golf club carrier releasing from the golf cart.

A leg lock cam 41 has a pivot axis E with respect to the carrier body 3, and wheel 31 has an axis J. As shown in FIG. 6, as the golfer further pulls after the motions in FIG. 5, the hitching devices release and the golf club carrier 1 begins to rotate about axis J. Thus, the mount claws 9 begin an upward motion detaching from a mount tube 55 of mount bracket 57. Jaw release springs 47 extend, causing a counter-clockwise rotation of mount lock jaws 37 about axis G to release the mount tube 55, and also causing the leg lock cams 41 to rotate about the axis E. The leg lock cams 41 continue to rotate about axis E until coming into contact with lower cam followers 43. The interaction of the leg lock cams 41 with the lower cam followers 43 prevents clockwise rotation of hinged leg assembly 7 about axis A even under the full torque imposed by the main leg springs 11. At the same time, the lower mount arm 33 is allowed to rotate counter-clockwise about axis H under the influence of the mount arm spring 61 (FIG. 16) until the lower mount arm latches 49 contact the jaw pins 51 (See FIG. 16).

Figure 7:
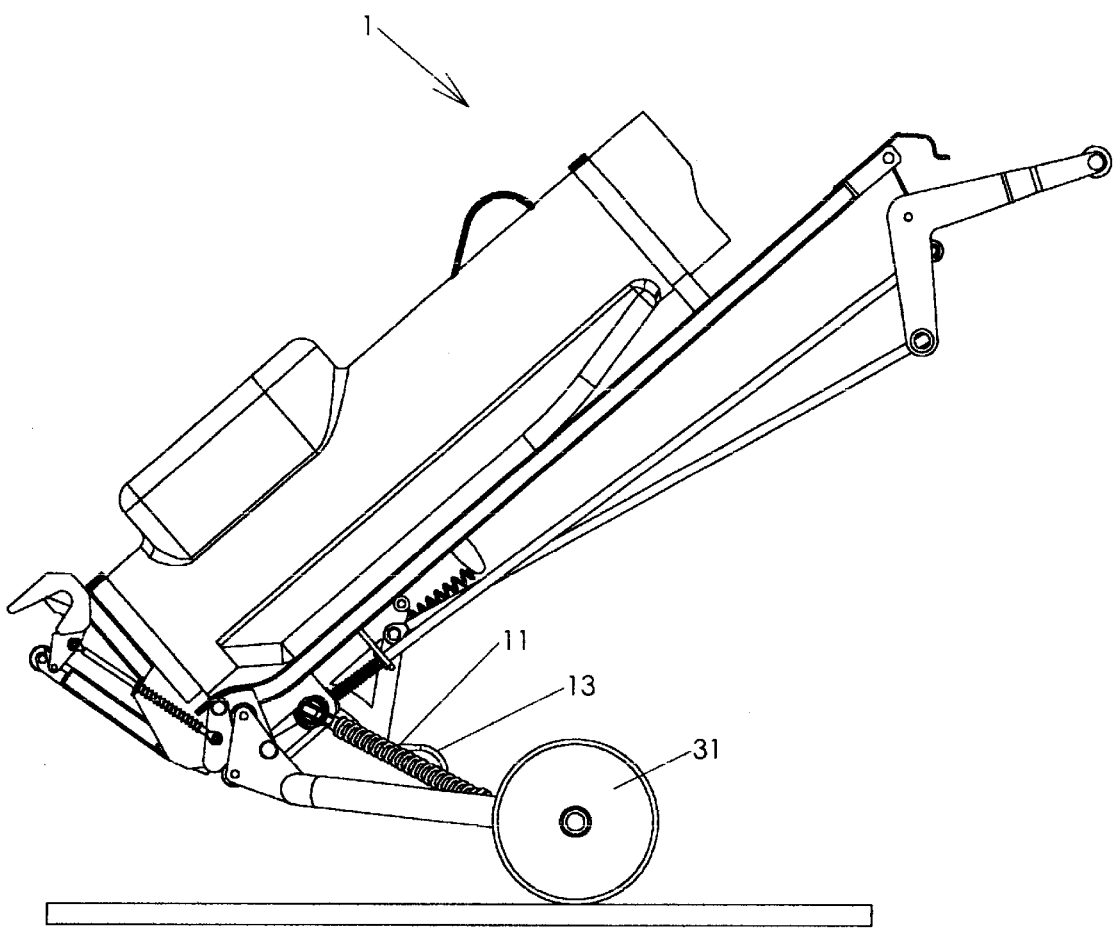
FIG. 7 shows a side view of the golf club carrier in FIG. 6 with the golf club carrier completely released.

As shown in FIG. 7, the carrier 1 thus is fully released from the motorized golf cart and can function as a pull or push cart for the golfer.

Figure 8:
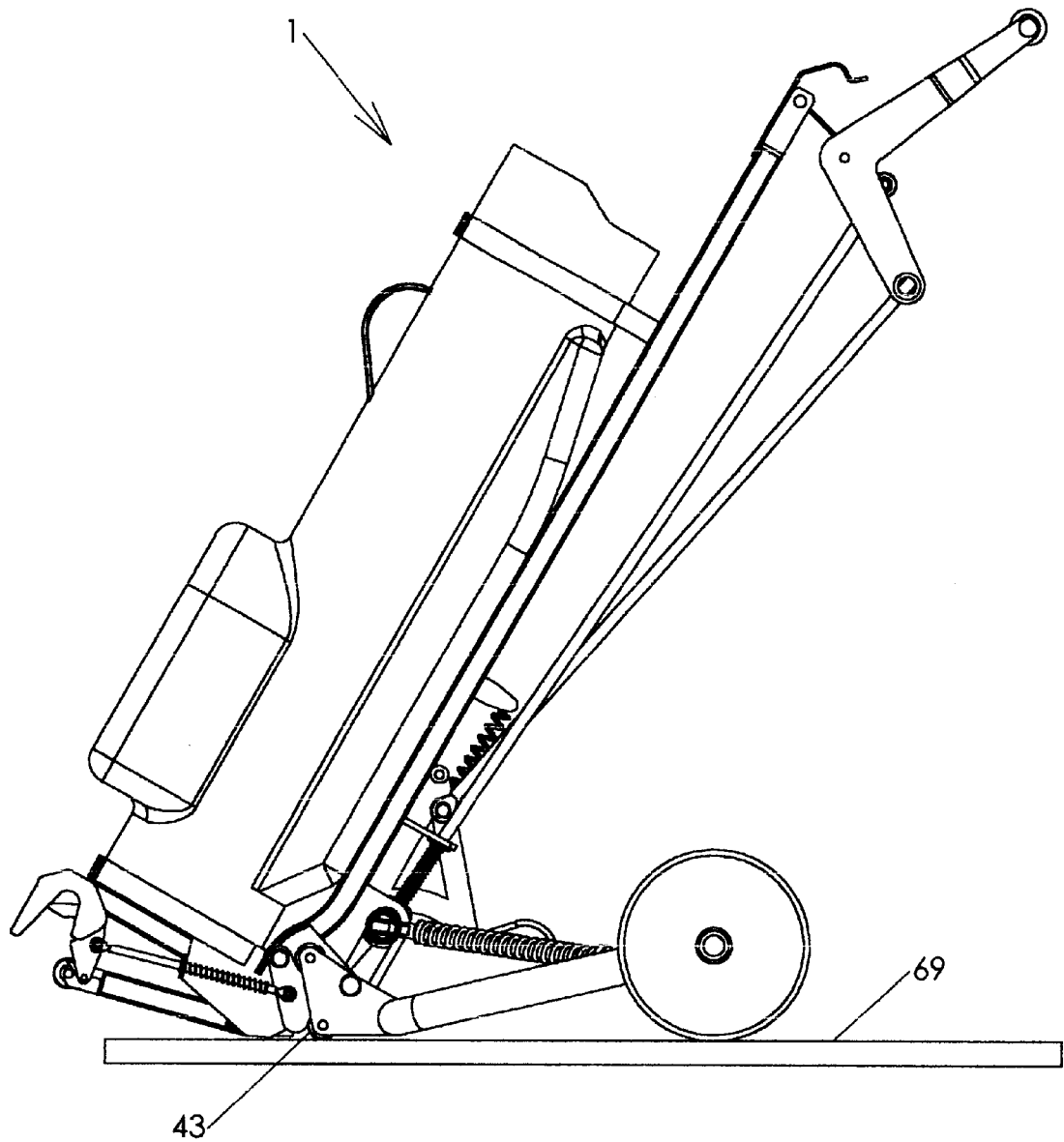
FIG. 8 shows a side view of the golf club carrier with a support surface resting on the ground.

As shown in FIG. 8 the lower cam followers 43 can then serve as a support surface for resting on ground surface 69 when the golfer wishes to choose a club.

After use, the carrier 1 can be reattached simply by the golfer pushing up on handle assembly 5, in the reverse order shown in FIGS. 2 through 6.

In the preferred embodiment, a low impact, single-hand release and attachment golf club carrier is provided.

However, other embodiments within the scope of the present invention are possible, including a trailered golf club carrier, or one in which the golf club carrier is attached at a first pivot point and then levered up and latched into place at a second higher location on the golf club carrier so that the wheels of the golf club carrier are off the ground. The latch could then be released by force or by a second hand unlatching the higher contact point.

The remaining figures show more details of the construction of the preferred embodiment described above, using consistent numbering as in the Figures above.

Figure 9:
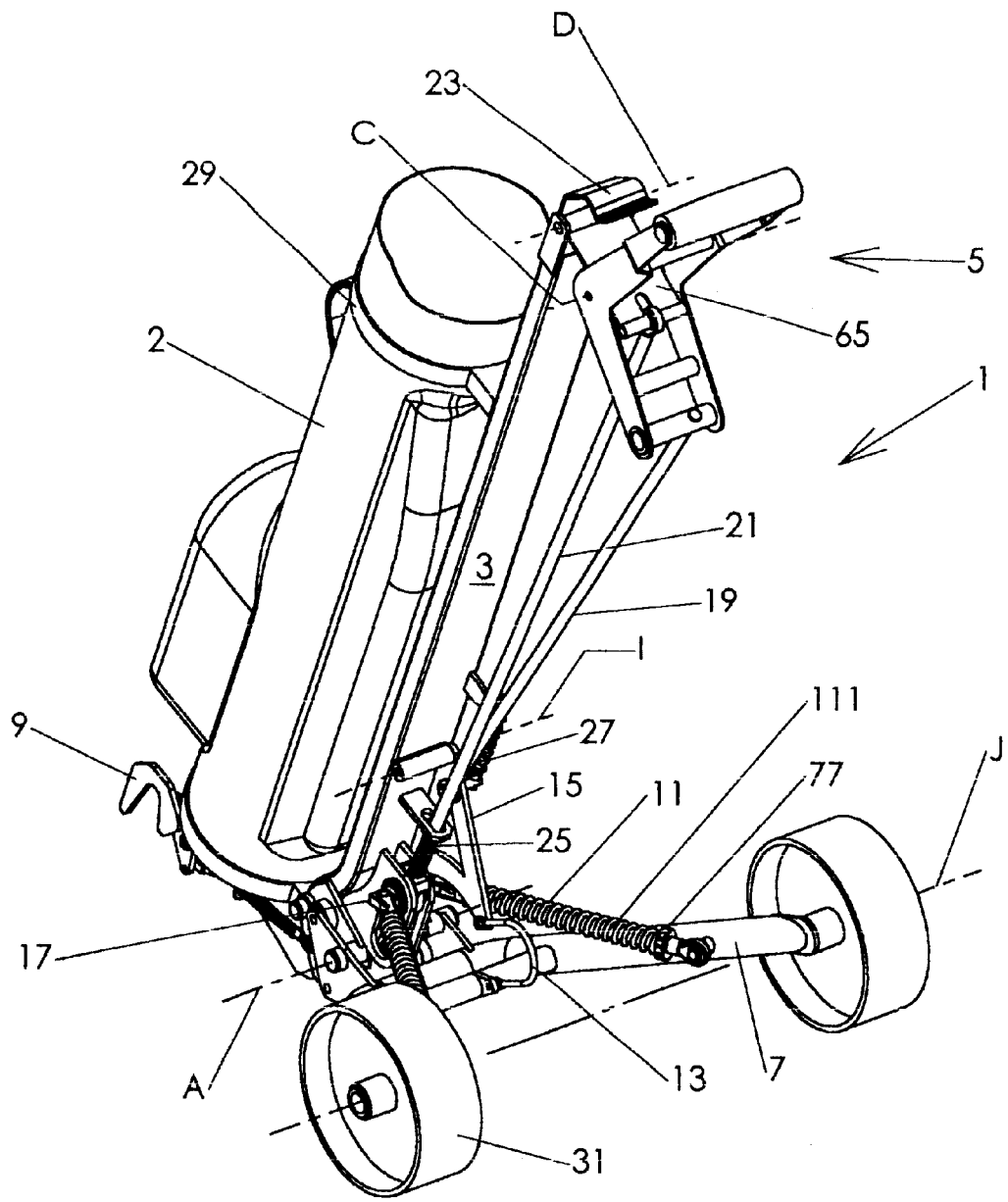
FIG. 9 shows a rear isometric view of the golf club carrier in the detached state from the motorized golf cart.

FIG. 9 is a rear isometric view of the golf club carrier in the detached state from the motorized golf cart 59, as shown in side view in FIG. 7. The back and bottom of the golf bag 2 rests against the carrier body 3 secured by straps 29. The wheels 31 are attached to the hinged leg assembly 7, which is pivotally mounted to main frame 3 about axis A. Main leg springs 11 are supported internally by the telescoping mandrel 111. The main leg springs 11 react at one end on the hinged leg assembly 7 and on the other end on the spring loading assembly 17. The preloaded spring force can be adjusted with spring adjustment collars 77 to compensate for various golf bag 2 weights. The handle assembly 5 is pivotally mounted to handle link arm 65 about axis C. The other end of handle link arm 65 is pivotally mounted to body 3 about axis D below the handle locking clip or spring 23. Leg actuation shaft 19 is pivotally mounted to handle assembly 5 and to leg actuation bracket 15. Spring load shaft 21 is pivotally mounted to handle link arm 65 and to spring loading assembly 17 and acts as a mandrel to load balance spring 25.

Figure 10:
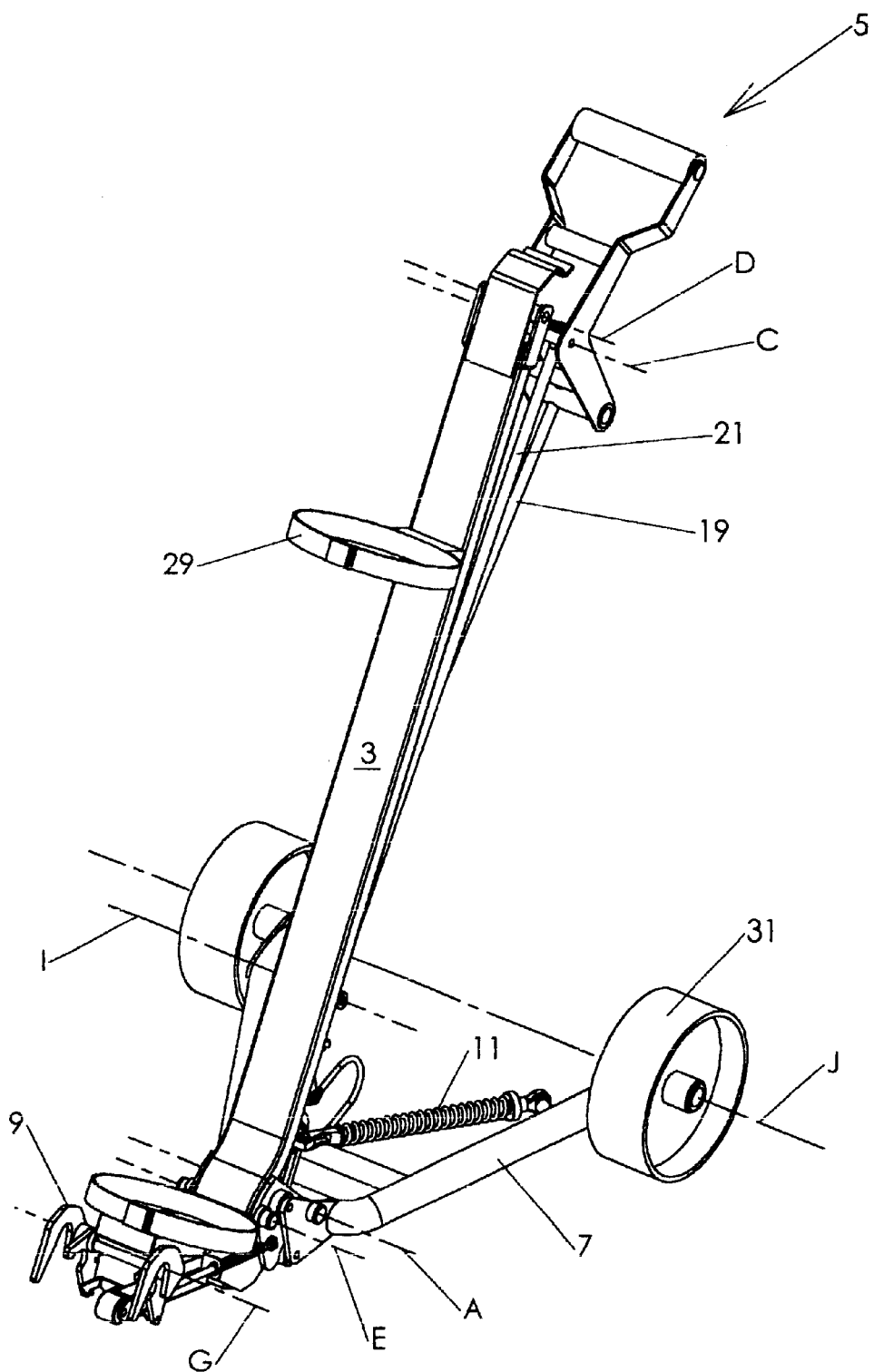
FIG. 10 shows a front isometric view of the golf club carrier in the detached state from the motorized golf cart with the golf bag hidden.

FIG. 10 is a front isometric view of the golf club carrier 1 in the detached state from the motorized golf cart 59 with the golf bag 2 not shown. This view shows the axes of rotation discussed above in describing the motion of attaching and detaching the golf club carrier 1 from the motorized golf cart.

Figure 11:
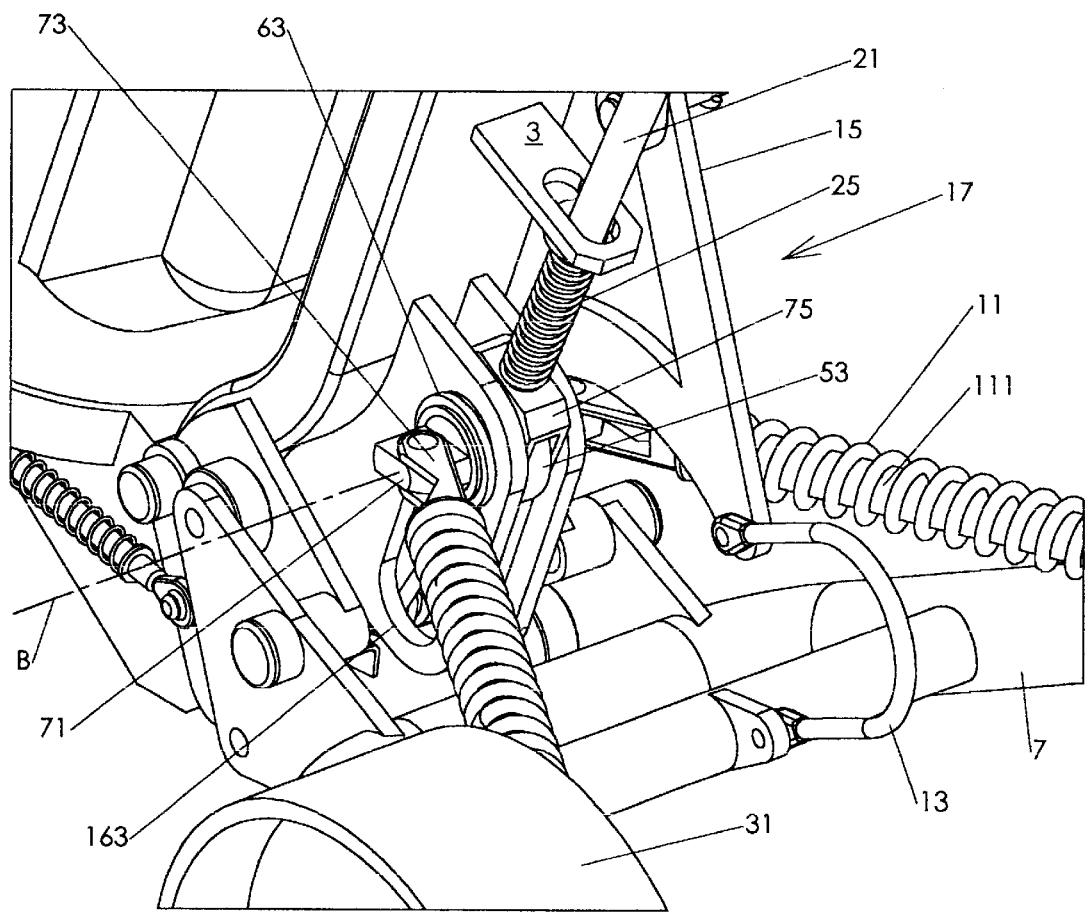
FIG. 11 shows a close up view of FIG. 9 showing more detail of the spring loading assembly and the main leg springs.

FIG. 11 shows a close up view of FIG. 9 showing more detail of the spring loading assembly 17 and the main leg springs 11. The spring loading assembly 17 includes a shaft 71, a set of bushings 63 which ride in slots 163 on the carrier body 3, a cam roller 53, and an actuation rod clevis 75 which attaches to the spring load shaft 21. The main leg spring mandrels 111 are attached to the spring loading assembly 17 by a set of main spring mandrel clevises 73. The central axis of the shaft 71 is axis B. The line of action of the telescoping spring mandrel 111 and hence the main leg spring 11 force is always through axis B, i.e. cuts through axis B at an angle so as to induce no torque about axis B. Leg actuation cable 13 is attached to leg actuation bracket 15 and to the hinged leg assembly 7.

Figure 12:
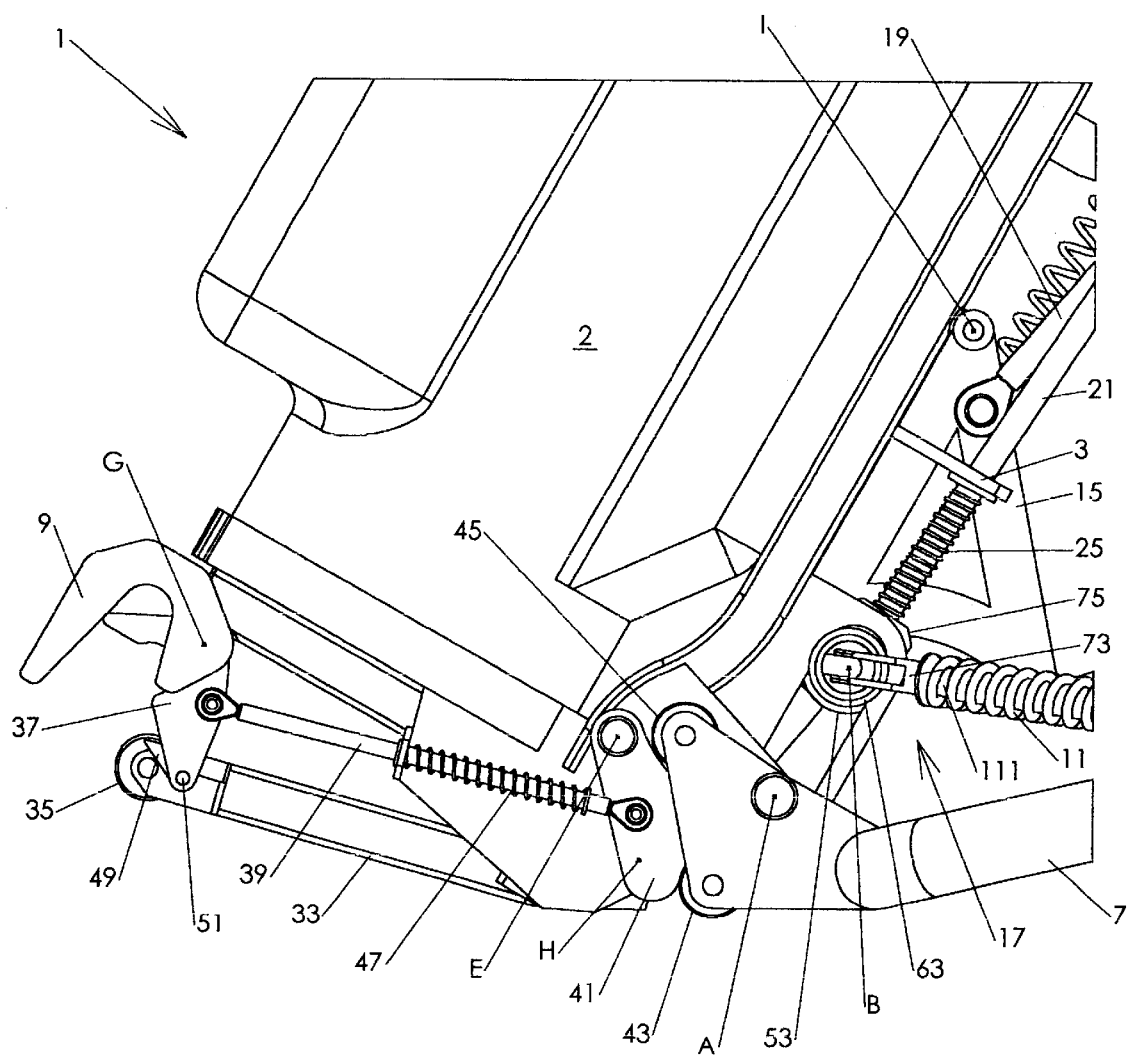
FIG. 12 shows a side view of the golf club carrier in the detached state from the motorized golf cart with details of the mounting and leg pivot lock mechanism.

FIG. 12 shows a side view of the golf club carrier 1 in the detached state from the motorized golf cart showing details of the mounting and leg pivot lock mechanism. In addition, it shows the position of axis A to axis B and the interplay between the lower mount arm 33 and the cam roller 53 in the spring loading assembly 17. The mount lockjaw 37 is pivotally mounted to the body 3 about axis G. A lock shaft 39 is pivotally mounted to mount lockjaw 37 and leg lock cam 41, acting as a mandrel for jaw release spring 47. Spring 47 imposes a counter clockwise torque on mount lock jaw 37 about axis G and leg lock cam 41 about axis E. Leg lock cam 41 is pivotally mounted to the carrier body 3 about axis E, and prevent clockwise rotation of hinged leg assembly 7 about axis A through interaction of lower cam follower 43 and leg lock cam 41 when golf club carrier is in detached state. Lower mount arm latch 49 is engaged with jaw pin 51 to prevent clockwise rotation of mount lock jaw 37 about axis G and counter-clockwise rotation of lower mount arm 33 about axis H (See also FIG. 4). Mount roller 35 is mounted to lower mount arm 33, free to rotate about its own axis.

Figure 13:
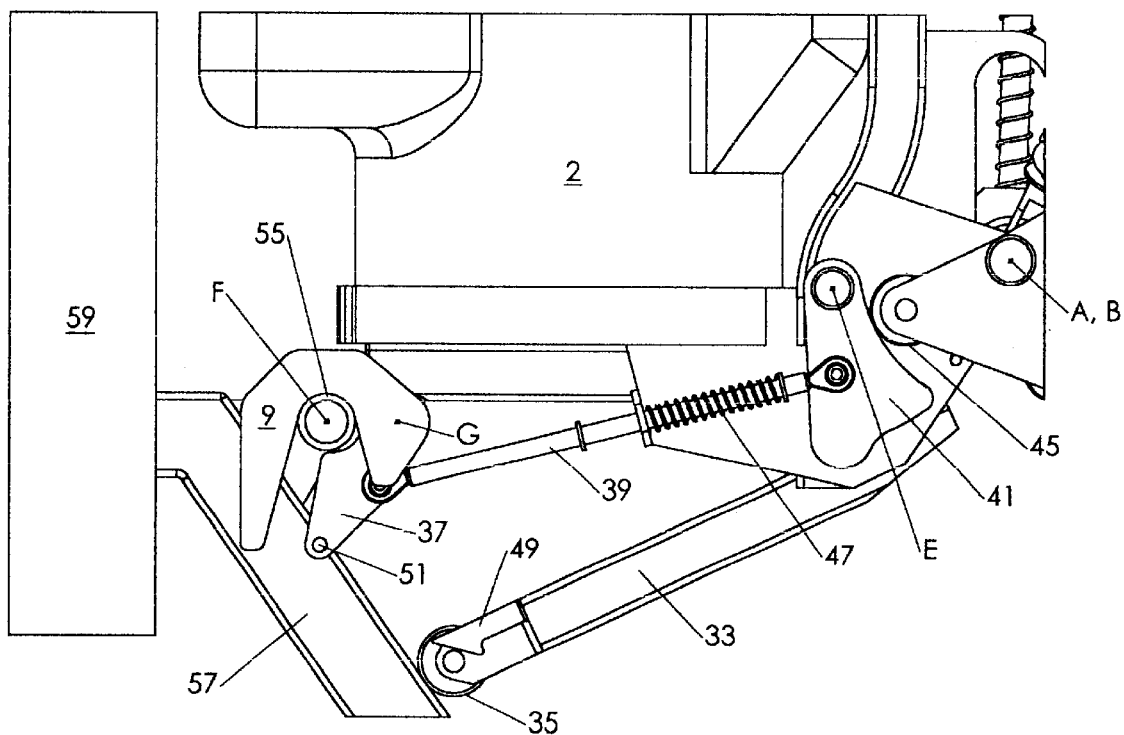
FIG. 13 shows a side view of the golf club carrier when attached to the motorized golf cart showing details of the mounting and leg pivot lock mechanism.

FIG. 13 shows a side view of the golf club carrier 1 when attached, as in FIG. 2, to the motorized golf cart 59 showing more details of the mounting and leg pivot lock mechanism. In the mounted configuration, axis A and axis B are coincident. The motorized golf cart mount bracket 57 is attached to the motorized golf cart 59. Mount tube 55 is attached to the motorized golf cart mount bracket 57. In the mounted configuration, mount claw 9 is engaged with mount tube 55. Mount lockjaw 37 is locked from rotating counter-clockwise due to the interaction of the leg lock cam 41 and upper cam follower 45 which prevents counter-clockwise rotation of leg lock cam 41 about axis E. This locks the golf club carrier onto mount tube 55 preventing translational motion. Lower mount arm 33 is locked from clockwise motion by cam roller 53 and counter-clockwise motion by interference with the carrier body 3. Interaction of mount roller 35 with the motorized golf cart mount bracket 57 therefore prevents clockwise rotation of the golf club carrier about axis F. Counter-clockwise rotation of the golf club carrier about axis F is limited as the golf bag 2 will eventually contact the motorized golf cart 59 preventing further rotation. Upper cam follower 45 is supported rotatingly in a bracket that is fixed to hinged leg assembly 7.

Figure 14:
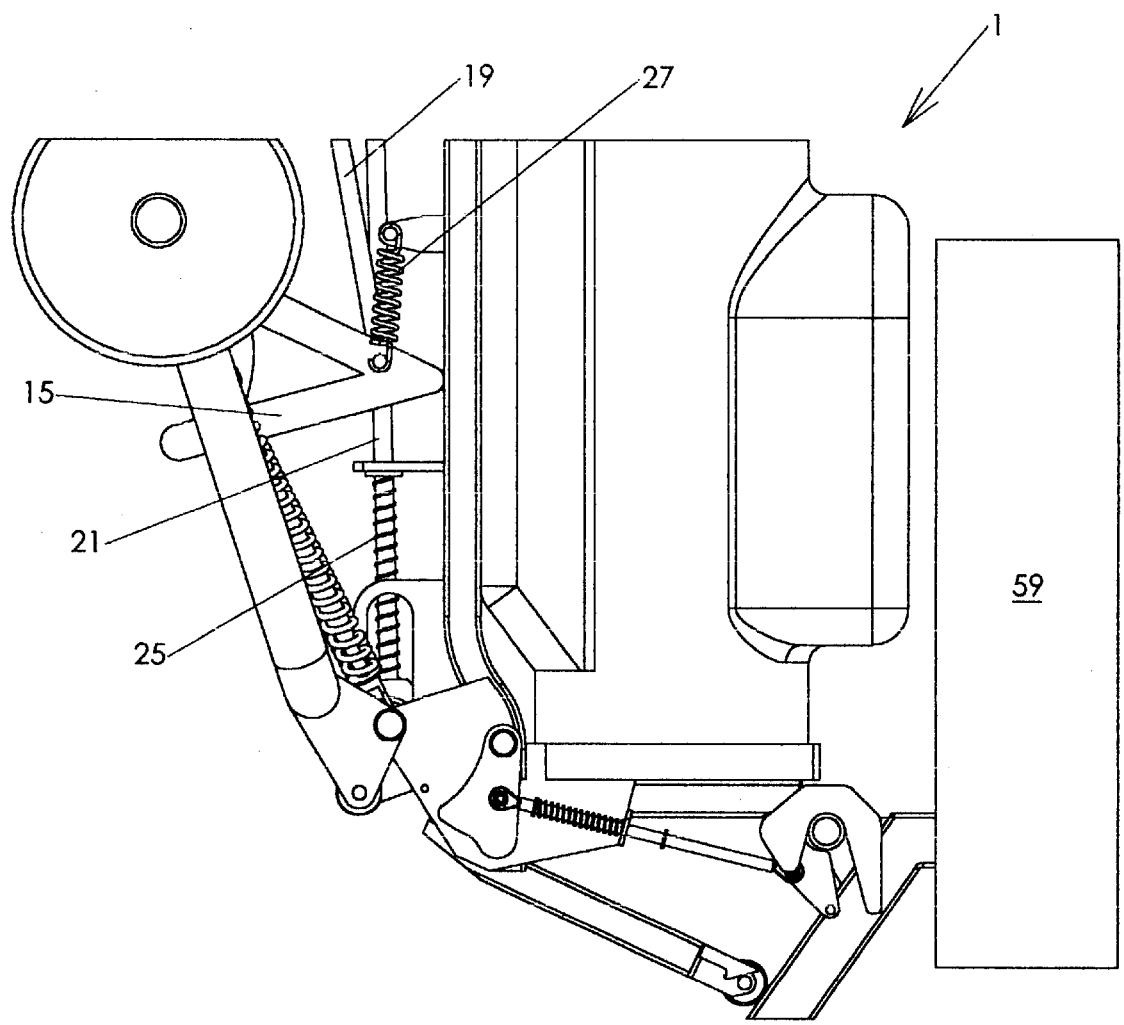
FIG. 14 shows a side view of the golf club carrier when attached to the motorized golf cart showing similar details to FIG. 13 except from the opposite side.

FIG. 14 shows a side view of the golf club carrier when attached to the motorized golf cart 59 showing similar details to FIGS. 2 and 13 except from the opposite side. For the most part, the mechanisms are identical on this side of the golf club carrier 1 as they were on the opposite side. However, the shown side does not have an upper cam follower 45 to lock the leg lock cam 41. An additional cam follower cam can easily be added to provide extra locking action, but is not necessary. FIG. 14 also shows leg actuation spring 27 and leg actuation bracket 15 in more detail.

Figure 15:
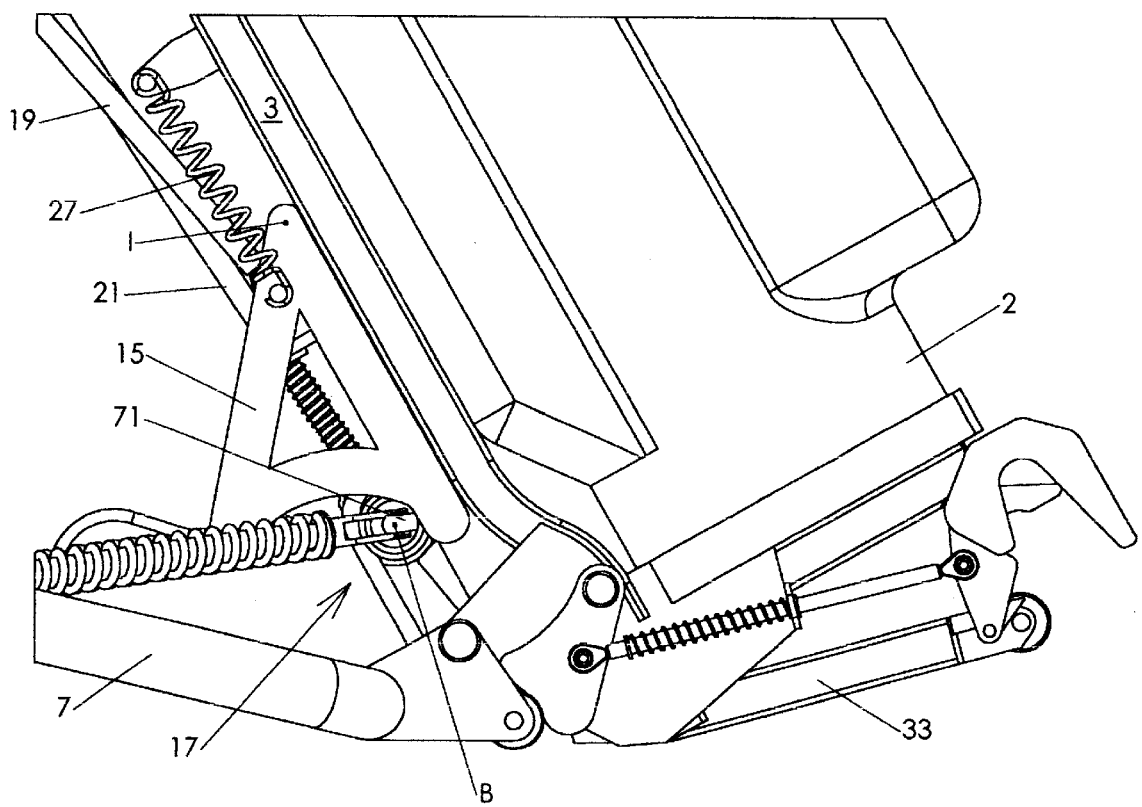
FIG. 15 shows a side view of the golf club carrier in the detached state from the motorized golf cart showing similar detail to FIG. 12 except from the opposite side.

FIG. 15 shows a side view of the golf club carrier 1 in the detached state from the motorized golf cart 59 showing similar detail to FIG. 12 except from the opposite side. Once again, the mechanisms and their interactions are essentially identical on this side of the golf club carrier as they were on the opposite side. This view show the interaction of the leg actuation bracket 15 with the spring loading assembly 17, namely the shaft 71. In the detached configuration, the leg actuation bracket 15 is locked by the spring loading assembly 17 from clockwise rotation about axis I and from counter-clockwise rotation about axis I by the body 3. This prevents motion of leg actuation shaft 19 relative to the body 3. In addition, the interaction between the cam roller 53 (See FIG. 11) and the lower mount arm 33 prevents motion of the spring loading assembly 17, hence preventing motion of spring load shaft 21 relative to the main frame 3. The affects of "locking" the leg actuation shaft 19 and the spring load shaft 21 prevents motion of the handle assembly 5 to the carrier body 3. Leg actuation spring 27 is shown in an extended position. The purpose of the spring 27 is to help counteract the torque about axis A of the hinged leg assembly 7 caused by the weight of the hinged leg assembly 7 and wheels 31. This will assist the golfer by requiring less force at the handle assembly 5 to get the hinged leg assembly 7 to store in its upward position when attached to the motorized golf cart 59.

Figure 16:
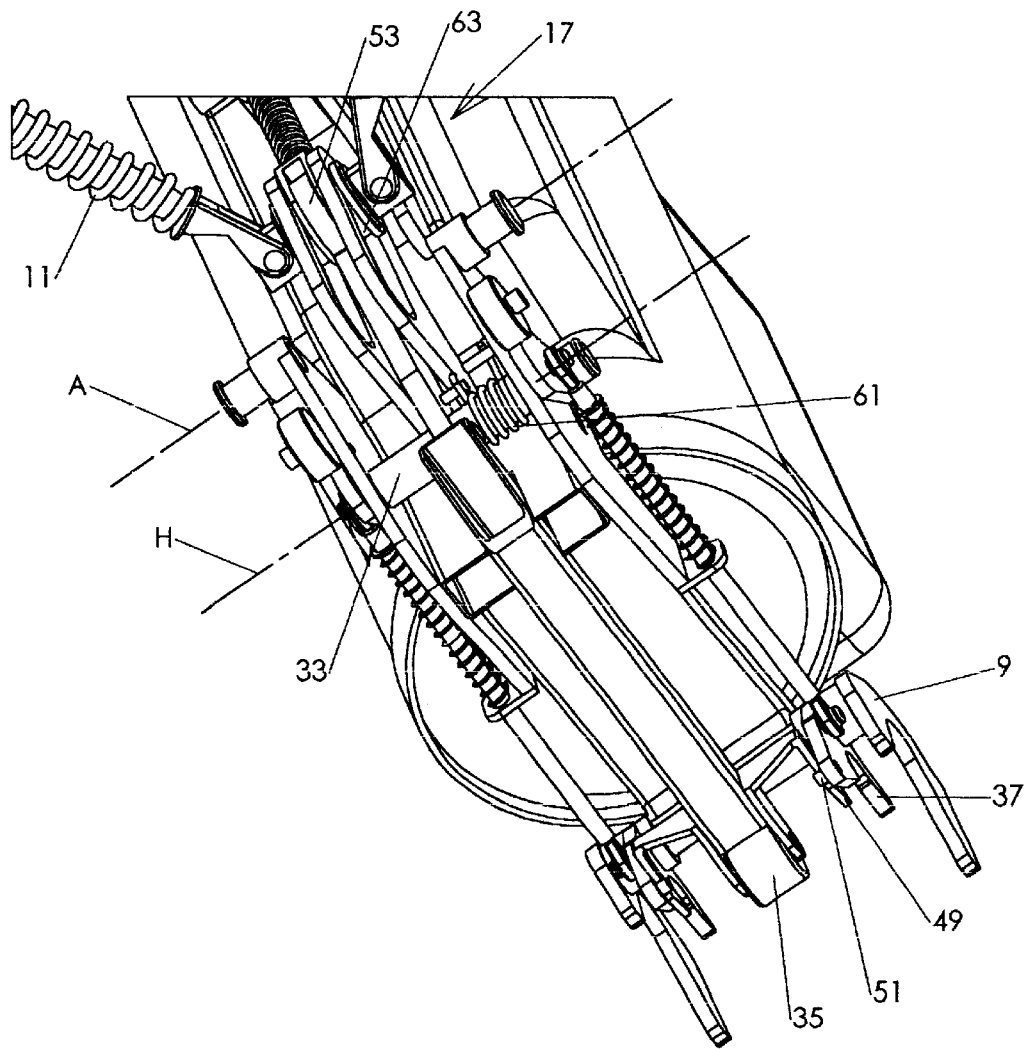
FIG. 16 shows a bottom isometric view of the golf club carrier in the detached state from the motorized golf cart with the hinged leg assembly hidden for clarity.

FIG. 16 shows a bottom isometric view of the golf club carrier in the detached state from the motorized golf cart with the hinged leg assembly 7 removed for clarity. The view shows the interaction of the lower mount arm 33 and the cam roller 53 of spring loading assembly 17. The spring loading assembly 17 is fixed from downward motion by contact with the lower mount arm 33 and from upward motion by contact with the top of the slots in the carry body 3. The lower mount arm 33 is pivotally mounted to carrier body 3 about axis H. Mount arm spring 61 imposes a torque on lower mount arm 33 about axis H attempting to push mount roller 35 downward, or away from the golf bag 2. This view also shows a different perspective on the interaction between the lower mount arm latches 49 and jaw pins 51, where the jaw pins 51 prevent the lower mount arm 33 and mount roller 35 from downward motion. At the same time, the lower mount arm latches 49 prevent the mount lock jaws 37 from closing which insures that the leg lock cams 41 prevent the hinged leg assembly 7 from rotating under the influence of torque caused by main leg springs 11. To allow the mount lock jaws 37 to close, the mount roller 35 must first be pushed upward towards the golf bag 2, disengaging the lower mount arm latches 49 from the jaw pins 51.

Figure 17:
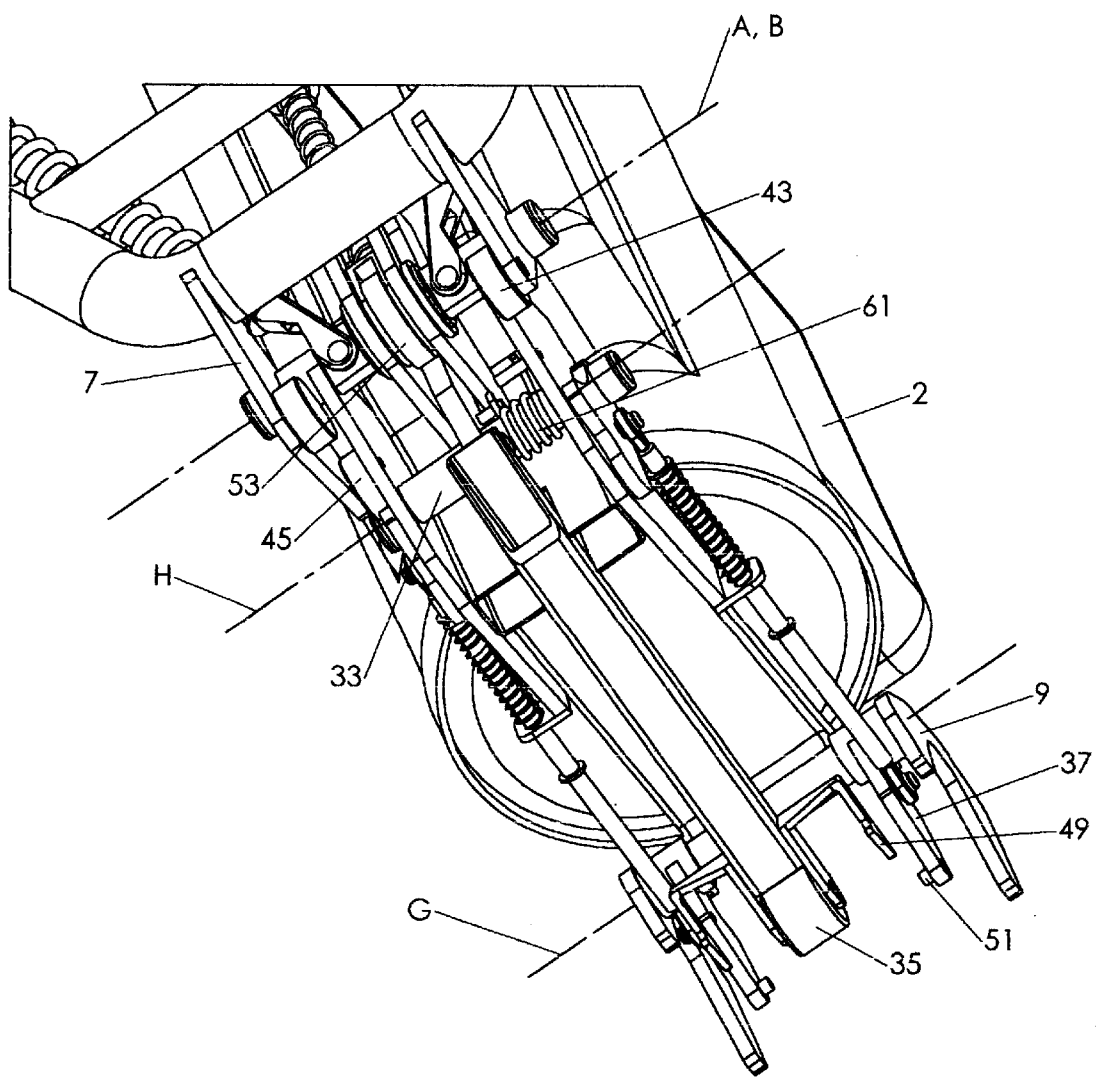
FIG. 17 shows a bottom isometric view of the golf club carrier when attached to the motorized golf cart with the motorized golf cart and mount bracket hidden for clarity.

FIG. 17 shows a bottom isometric view of the golf club carrier 1 when attached to the motorized golf cart with the motorized golf cart and motorized golf cart mount bracket removed for clarity. The spring loading assembly 17 is in its bottom position in which axis A and axis B are coincident. Furthermore, cam roller 53 is in contact with lower mount arm 33 preventing rotation of the lower mount arm 33 about axis H, which would cause upward motion of mount roller 35.

Figure 18:
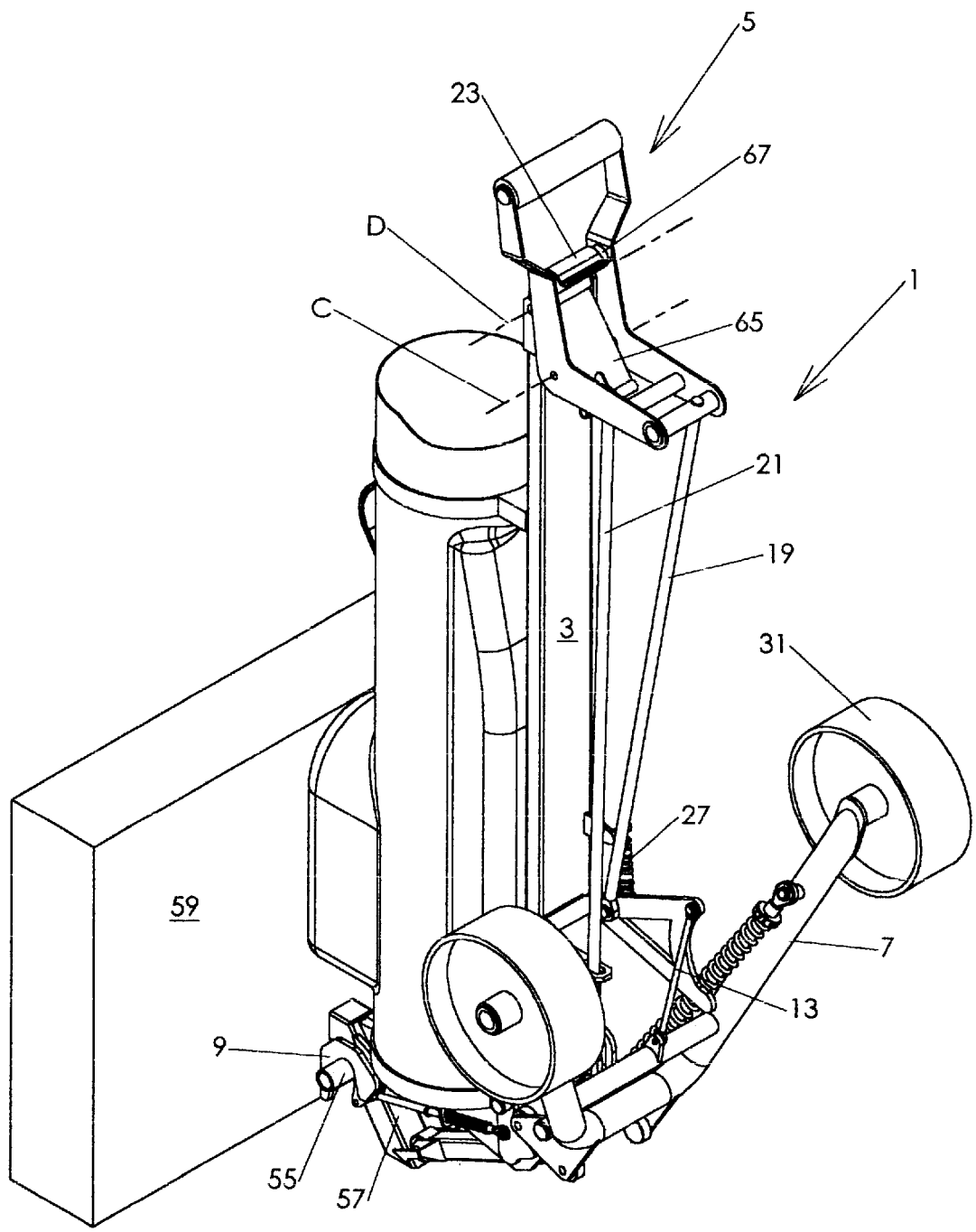
FIG. 18 shows a rear isometric view of the golf club carrier when attached to the motorized golf cart.

FIG. 18 shows a rear isometric view of the golf club carrier 1 as in FIG. 2 when attached to the motorized golf cart 59. In this view, the hinged leg assembly 7 and wheels 31 are stored in an upward configuration to create a more compact design and provide better access to the golf bag 2. This view also shows how the handle assembly 5 is latched to secure the golf club carrier to the motorized golf cart 59. Within the handle assembly 5 is latch shaft 67 which is held by latch leaf spring 23. To begin the detachment procedure, the handle assembly 5 is pulled away (rotated about axis C) from the motorized golf cart 59 with sufficient force so as to elastically deform the latch leaf spring 23 to cause it to release latch shaft 67. To end the attachment procedure, the handle assembly 5 is pushed toward (rotated about axis C) the motorized golf cart 59 with sufficient force so as to elastically deform the latch leaf spring 23 to cause it to capture the latch shaft 67.

It should be realized that the first hitching device of the motorized golf cart could include be a trailer removable from the golf cart. "Frame" as defined herein can be any part of the golf cart.

It should also be realized that withing the scope of certain claims, a slight lifting of the club carrier may occur. However, this lifting is still less than the lifting which occurs when the golf clubs are not placed on a seat or the golf bag bay.

What is claimed is:

1. A golf cart with a detachable golf club carrier comprising:
    a motorized golf cart for movement over a ground surface, the golf cart having seating for at least two golfers, the golf cart having a rear bag bay and having a motor and first hitching device and a third hitching device, and
    a manually-operable golf club carrier having at least one wheel and a second hitching device removably connected to one of the first hitching device and the third hitching device, the second hitching device being connectable with the one of the first hitching device and the third hitching device while the at least one wheel is on the ground surface.

2. The golf cart as recited in claim 1 wherein the at least one wheel is retractable from the ground surface when the second hitching device is connected to the first hitching device.

3. The golf cart as recited in claim 1 wherein the first hitching device includes a bar and the second hitching device includes a latch for latching onto the bar.

4. The golf cart as recited in claim 1 wherein the golf club carrier has two wheels and further includes an axle connecting the two wheels.

5. The golf cart as recited in claim 1 wherein the golf club carrier includes an actuating device for removably connecting the second hitching device to the first hitching device.

6. The golf cart as recited in claim 5 wherein the carrier includes a carrier body, and the actuating device includes a handle rotatable with respect to the carrier body.

7. The golf cart as recited in claim 1 wherein the golf club carrier includes a carrier body and a golf club bag removable from the carrier body.

8. The golf cart as recited in claim 1 wherein the first hitching device is located at a side of the golf cart.

9. The golf cart as recited in claim 1 further comprising a second golf club carrier having at least one second wheel and a fourth latching device removably connected to the other of the first hitching device and the third hitching device.

10. The golf cart as recited in claim 1 wherein one of the first and second hitching devices has a horizontal mount tube.

11. The golf cart as recited in claim 10 wherein the other of the first and second hitching devices includes at least one mount claw having an opening for attaching to the horizontal mount tube.

12. The golf cart as recited in claim 11 wherein the at least one mount claw includes two mount claws spaced apart from each other.

13. The golf cart as recited in claim 11 wherein the golf club carrier is rotatable about an axis defined by the mount claw so as to permit the at least one wheel to leave the ground surface.

14. The golf cart as recited in claim 1 wherein the golf club carrier is rotatable with respect to the golf cart so as to lift the at least one wheel from the ground surface.

15. The golf cart as recited in claim 1 wherein at least one of the golf cart and the golf club carrier includes a loading assembly to aid in lifting the at least one wheel from the ground surface.

16. The golf cart as recited in claim 15 wherein the loading assembly includes a spring, the spring compressing when the at least one wheel is lifted from the ground surface.

17. The golf cart as recited in claim 15 wherein the golf club carrier has a carrier body and the loading assembly, the loading assembly including a spring located between the at least one wheel and the carrier body.

18. The golf cart as recited in claim 17 wherein a handle is connected to the loading assembly via a spring load shaft.

19. The golf cart as recited in claim 15 wherein the golf cart is four-wheeled.

20. The golf cart as recited in claim 1 wherein the first hitching device has a horizontal mounting tube, and the second hitching device has a mount claw for attaching to the horizontal mounting tube.

21. The golf cart as recited in claim 10 wherein the one of the first and second hitching devices further includes a sloped mount bracket, and other of the first and second hitching device includes a mount claw for connecting to the horizontal mount tube and a lower mount arm for connecting to the sloped mount bracket.

22. A motorized golf cart with a detachable golf club carrier comprising:
- a motorized golf cart for movement over a ground surface, the golf cart having seating for at least two golfers, the golf cart having a rear bag bay and having a motor and a first hitching device and a third hitching device at an exterior of the golf cart, and
- a golf club carrier having a handle, a carrier body, a golf club bag, at least one wheel and a second hitching device, the golf club bag being selectively attachable to the carrier body, the second hitching device removably connectable to one of the first hitching device and the third hitching device when the at least one wheel is on the ground, the second hitching device being connected to the carrier body.

23. A motorized golf cart with a detachable golf club carrier comprising:
- a golf cart for movement over a ground surface, the golf cart having seating for at least two golfers, the golf cart having a rear bag bay and having a motor and a first hitching device and a third hitching device at an exterior of the golf cart, and
- a golf club carrier having a handle, a carrier body, a golf club bag, at least one wheel and a second hitching device for connecting to one of the first hitching device and the third hitching device while the at least one wheel is in a connecting position on the ground surface, the golf club carrier having a weight and a bottom, the first hitching device carrying the weight of the golf club carrier in a locked position without the bottom contacting the golf cart.

24. A golf cart with a detachable golf club carrier comprising:
- a four-wheeled motorized golf cart for movement over a ground, surface, the golf cart having seating for at least two golfers, the golf cart having a rear bag bay and having a motor and a first hitching device and a third hitching device, and
- a manually-operable golf club carrier having two wheels and a second hitching device removably connected to one of the first hitching device and the third hitching device, the second hitching device being connectable in a first position to the one of the first hitching device and the third hitching device while the two wheels are on the ground surface, the golf club carrier having a second position connected to the golf cart with the two wheels off the ground surface.

25. The golf cart as recited in claim 24 wherein the first hitching device can rotate about the second hitching device in the first position.

26. The golf cart as recited in claim 25 wherein the first hitching device is fixed to the second hitching device in the second position.

27. A golf cart with a detachable golf club carrier comprising:
- a four-wheeled motorized golf cart for movement over a ground surface, the golf cart having seating for at least two golfers, the golf cart having a rear bag bay and having a motor and a first hitching device and a third hitching device,
- a first manually-operable golf club carrier having two wheels and a second hitching device removably connected to one of the first hitching device and the third hitching device, the second hitching device being connectable in a first position to the one of the first hitching device and the third hitching device while the two wheels are on the ground surface, the golf club carrier having a second position connected to the golf cart with the two wheels off the ground surface; and
- a second manually-operable wheeled golf club carrier having a fourth hitching device removably connected to the other of the first hitching device and the third hitching device.

28. The golf cart as recited in claim 27 wherein the first hitching device can rotate about the second hitching device in the first position.

29. The golf cart as recited in claim 28 wherein the first hitching device is fixed to the second hitching device in the second position.

* * * * *